United States Patent [19]

Landry

[11] Patent Number: 5,408,647
[45] Date of Patent: Apr. 18, 1995

[54] AUTOMATIC LOGICAL CPU ASSIGNMENT OF PHYSICAL CPUS

[75] Inventor: John A. Landry, Tomball, Tex.

[73] Assignee: Compaq Computer Corporation, Houston, Tex.

[21] Appl. No.: 956,649

[22] Filed: Oct. 2, 1992

[51] Int. Cl.6 .............................................. G06F 11/00
[52] U.S. Cl. .................................... 395/575; 371/16.1
[58] Field of Search ........................ 395/575; 371/16.1

[56] References Cited

U.S. PATENT DOCUMENTS

| | | | |
|---|---|---|---|
| 4,117,459 | 9/1978 | Douglas | 371/16.1 |
| 4,499,581 | 2/1985 | Miazga | 371/16.1 X |
| 4,502,116 | 2/1985 | Fowler | 364/200 |
| 4,606,024 | 8/1986 | Glass | 371/16.1 |
| 4,634,110 | 1/1987 | Julich | 371/11 |
| 4,646,298 | 2/1987 | Laws | 371/16 |
| 4,775,976 | 10/1988 | Yokoyama | 371/9 |
| 4,823,256 | 4/1989 | Bishop et al. | 371/9 |
| 4,839,895 | 7/1989 | Makita | 371/16 |

FOREIGN PATENT DOCUMENTS 0270064 6/1988 European Pat. Off. .
0486304 5/1992 European Pat. Off. .

OTHER PUBLICATIONS

Start–Up Master Processor Selection Method for Multi-Processory Systems, IBM Technical Disclosure Bulletin, vol. 33, No. 4, Sep. 1990, pp. 375–376.

*Primary Examiner*—Robert W. Beausoliel, Jr.
*Assistant Examiner*—Glenn Snyder
*Attorney, Agent, or Firm*—Pravel, Hewitt, Kimball & Krieger

[57] ABSTRACT

A multiprocessor computer system includes fault tolerant power up logic for finding a functioning CPU to operate as logical CPU0. Each microprocessor has a physical location designation which remains constant. When the system is powered up, all of the CPUs except the CPU in physical slot 0 (CPU P0) are initially placed in an inactive sleep state. The microprocessor in physical location 0 performs its power on self test (POST), and if the CPU functions properly, the CPU is designated as logical CPU0 (CPU L0). The microprocessor then awakens the remaining CPUs and boots up the rest of the computer system. If CPU P0 is not functioning properly, after a given time period the system awakens the processor in the next physical location and repeats the process of testing the CPU. The process repeats until an operating microprocessor is found to perform the CPU L0 functions.

6 Claims, 4 Drawing Sheets

AUTOMATIC LOGICAL CPU ASSIGNMENT OF PHYSICAL CPUS

BACKGROUND OF THE INVENTION

1. Field of the Invention

The invention relates to multiprocessor computer systems, and more particularly, to startup logic for assigning logical central processing unit (CPU) designations among multiple CPUs.

2. Description of the Related Art

Advancements in computer technology proceed at a tremendous rate. Modern microprocessors operate at frequencies so high that processors only a few years old seem sluggish and lethargic in comparison. On the other hand, modern applications have become so complex and versatile that even the high performance delivered by modern systems is taxed to the limit. Consequently, the effort to develop yet more powerful and effective computer systems continues.

One well known method of improving computer performance is to provide multiple processors in a single system. Asymmetrical multiprocessor systems, in which one microprocessor is the master and another microprocessor performs specific functions as a slave of the master microprocessor, are common and well known. Although the master/slave relationship improves computer performance due to the division of tasks, the computer does not operate at maximum capability. This is because the slave processor performs only particularly designated operations, and thus remains idle when a task not designated for the slave processor is performed. While these operations are executed, the computer system is no more efficient than a single processor system.

The computer system's efficiency may be further enhanced by making the multiple processors symmetrical. In a symmetrical system, any processor can perform any required function. Thus, all microprocessors operate simultaneously, spending little or no idle time, and the computer system operates near its maximum efficiency. In addition, the system may be further improved by adding supplementary microprocessors as the workload increases. Adding microprocessors is particularly effective in file server systems having an array of independent functions to be performed simultaneously.

Although symmetrical multiprocessor systems are efficient, they are difficult to design. One of the many obstacles to overcome in designing a symmetrical multiprocessor system is the potential presence of a non-functional processor. A simple method of booting up a multiprocessor system is to power up one of the central processing units (CPUs), generally designated CPU0, and ignore the others. When the first CPU has booted up, the first CPU then turns on and tests the remaining CPUs and the various components of the system. If the first microprocessor does not function properly, however, it cannot turn on the remaining processors and the entire system is left incapacitated. Consequently, the computer owner or operator has a computer system with one or more operational CPUs, but ironically, the system is useless until the repairman arrives.

In addition, for many DOS based applications, one of the CPUs must be designated as CPU0. CPU0 commonly performs various functions for the system, like DRAM refresh operations, which make CPU0 unique even in a symmetrical multiprocessor system. Thus, most multiprocessor systems require one of the microprocessors to be designated as CPU0. In many systems, a CPU residing in a particular physical location is always designated as CPU0. If one of the CPU locations is always designated as containing CPU0, however, the slot may be empty, or the CPU may fail, crippling the entire system.

SUMMARY OF THE INVENTION

The present multiprocessor computer system includes power up logic for finding a functioning CPU to designate as CPU0. Each microprocessor has a physical location designation which remains constant. Because the CPU designated as CPU0 may not occupy physical location 0 in the computer, the designated CPU is referred to as logical CPU0, or CPU L0. When the system is powered up, all of the CPUs except the CPU in physical slot 0 (CPU P0) are initially placed in a SLEEP mode. The microprocessor in physical location 0 performs its power on self test (POST) routine and tests its associated cache memory system. If the CPU functions properly, the CPU is designated as CPU L0, and the microprocessor retains this designation until the system is power cycled. The CPU designated as CPU L0 then awakens the remaining CPUs and boots up the rest of the computer system.

If CPU P0 is not functioning properly, it is designated as inoperative. The system then awakens CPU P1 and repeats the process of testing the CPU. If CPU P1 is operational, then it is designated as CPU L0, and it boots the remainder of the system. On the other hand, if CPU P1 also fails, it is also given an inoperative designation. The computer system then turns on CPU P2, and repeats the process. The process repeats until an operational microprocessor is found to perform the CPU L0 functions. Consequently, if at least one of the microprocessors in the system is functioning, the computer system boots and operates. Thus, the multiprocessor system is not crippled by the failure of a single processor, enhancing the dependability of the computer system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
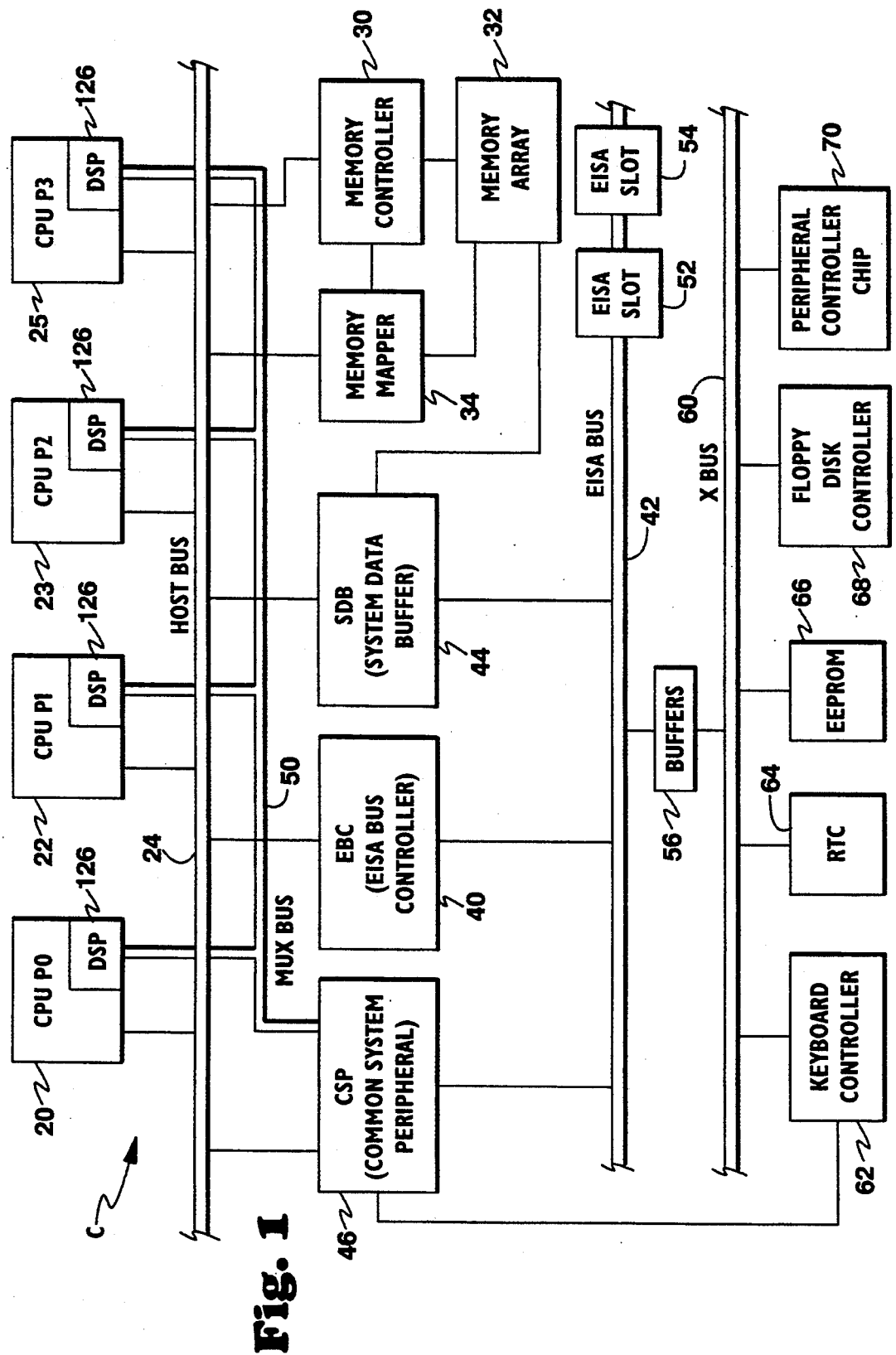
FIG. 1 is a block diagram of a computer system incorporating the present invention.

Referring now to FIG. 1, a computer system C is shown. The computer system C includes four CPU boards 20, 22, 23, 25 connected to a host bus 24 and a memory controller 30, which is also coupled to the host bus 24. Although four CPUs 20, 22, 23, 25 are used in the preferred computer system C, the present system functions for any multiprocessor system. Each CPU occupies a physical slot in the computer system by which the CPUs 20, 22, 23, 25 are designated. Thus, CPU P0 20 is the CPU that occupies physical slot 0 in the system. The CPUs are designated CPU P0 20, CPU P1 22, CPU P2 23, and CPU P3 25, in reference to each CPU's physical location.

A main memory array 32, preferably comprised of dynamic random access memory (DRAM) modules, is coupled to the memory controller 30. Memory mapper logic 34 is coupled to the host bus 24, the memory controller 30, and the memory array 32. The memory mapper logic 34 provides memory mapping functions to facilitate memory accesses to the memory array 32.

A bus controller 40, preferably an EISA bus controller (EBC), is coupled between the host bus 24 and an expansion bus 42, preferably an Extended Industry Standard Architecture (EISA) bus. The EBC 40 provides various bus cycle translation and conversion functions to facilitate transfers between the host bus 24 and the EISA bus 42. A system data buffer (SDB) 44 is also coupled between the host bus 24, the memory array 32 and the EISA bus 42. A logic block referred to as the common system peripheral (CSP) 46 is coupled between the host bus 24 and the EISA bus 42. The CSP 46 is also coupled through a MUX bus 50 to logic blocks referred to as distributed system peripherals (DSPs) 126 in each of the CPUs 20, 22, 23, 25. The CSP 46 includes various system components including a direct memory access (DMA) controller, an EISA arbitration controller, and numerous system board logic functions like memory refresh control and interrupt logic.

The EISA bus 42 includes a plurality of EISA slots 52 and 54 for receiving EISA expansion cards, like a network interface card or a hard disk interface card. The EISA bus 42 is coupled through buffers 56 to a bus referred to as the X bus 60. A number of peripheral devices are coupled to the X bus 60 including the keyboard controller 62, a real time clock (RTC) 64, an electrically erasable programmable read only memory (EEPROM) 66, a floppy disk controller 68, and a peripheral controller chip 70, which includes numerous ports and UARTs (universally asynchronous receiver/transmitters).

The MUX bus 50 between the CSP 46 and the various DSPs 126 associated with the CPUs 20, 22, 23, 25 includes an XAD bus. The XAD bus is an 8-bit bi-directional data bus on which interrupt, I/O, and special cycle data is transferred. The MUX bus 50 further includes a cycle status bus called the XST bus. This three-bit bus is controlled by the CSP 46 and defines the cycle currently being transferred on the 8-bit MUX bus 50. The MUX bus 50 further includes a two-bit XBP bus, which is an input bus on which DMA byte pointer information is received from the DSPs 126. Using the XAD, XST, and XBP buses, the CSP 46 interfaces with the DSPs 126 to provide interaction between the general computer system C and the CPUs 20, 22, 23, 25. The MUX bus 50 is a broadcast bus that transmits all signals to all of the CPUs 20, 22, 23, 25, and each CPU 20, 22, 23, 25 determines whether it is the CPU being accessed.

For more information on the operation of the MUX bus 50, please see related copending application Ser. No. 07/955,482, entitled MULTIPLEXED COMMUNICATION PROTOCOL BETWEEN CENTRAL AND DISTRIBUTED PERIPHERALS IN MULTIPROCESSOR COMPUTER SYSTEMS, filed concurrently with this application, which is hereby incorporated by reference. For more information regarding the CSP 46 and the DSPs 126, please see related copending application Ser. No. 07/955,683, entitled ARRANGEMENT OF DMA, INTERRUPT AND TIMER FUNCTIONS TO IMPLEMENT SYMMETRICAL PROCESSING IN A MULTIPROCESSOR COMPUTER SYSTEM, also filed concurrently with this application, which is hereby incorporated by reference.

The CSP 46 provides an interface between the MUX bus 50 and the EISA bus 42 and X bus 60 of the computer system C. Various transfers and operations are defined on the MUX bus 50 using the XST bus to define the transfer and the XAD bus to identify addresses, data, and interrupts. The CSP 46 implements a MUX bus master interface to assert interrupts and transfer data to and from the DSPs 126. The CSP 46 in the present system also includes power up timer logic. When the system is powered up, a power up timer begins counting. If CPU 20 in physical location zero does not write to a particular DSP port accessed via the CSP 46 within a specific interval, which is two seconds in the preferred embodiment, the CSP 46 asserts a power up timeout (PUTO) signal to all of the DSPs 126. The PUTO signal is generated as a miscellaneous data transfer on the MUX bus 50. As described below, the PUTO signal causes the current CPU to be designated as inoperative and initiates testing of the next CPU.

Figure 2:
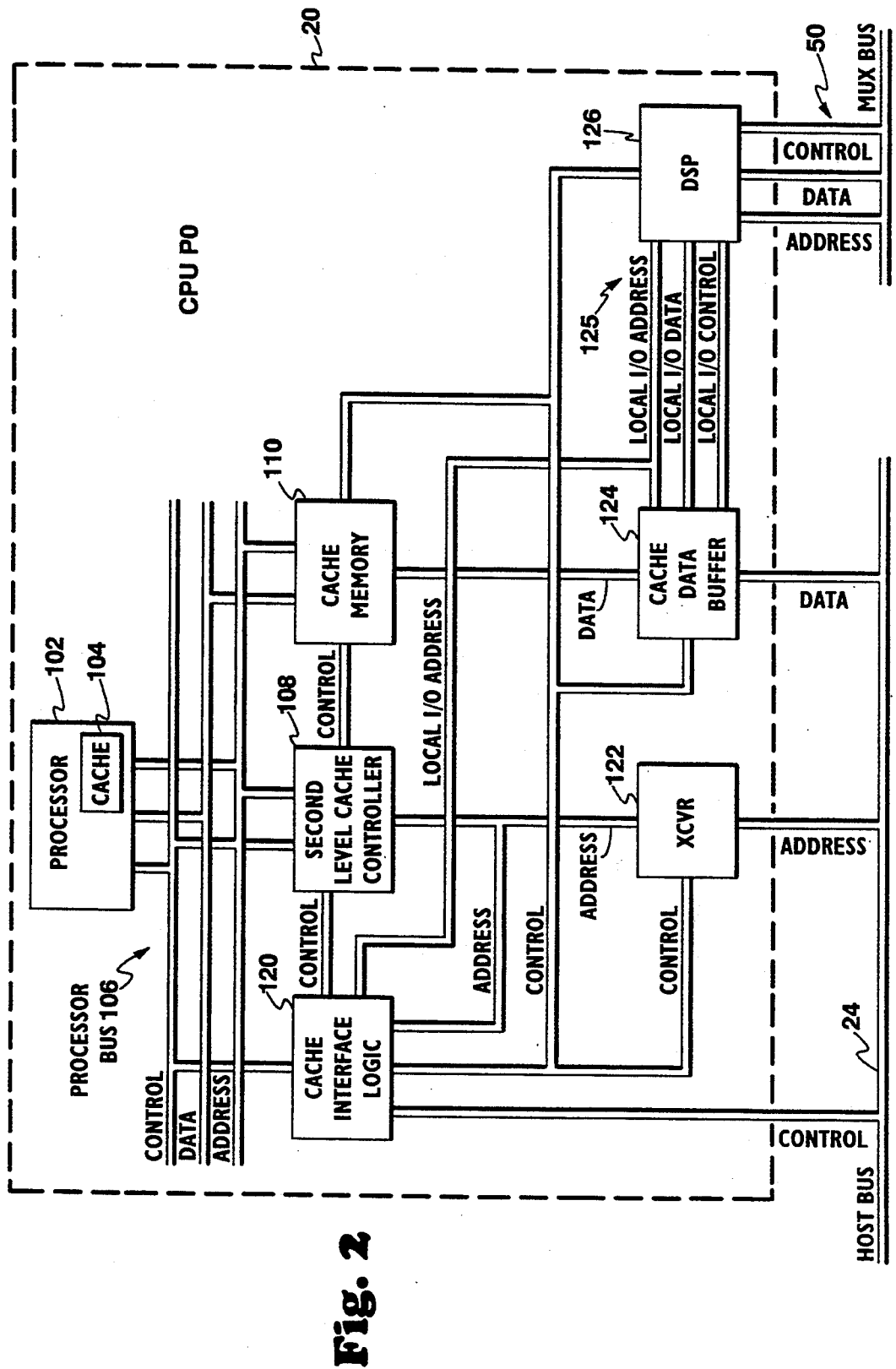
FIG. 2 is a block diagram of the CPU board of FIG. 1.

Referring now to FIG. 2, a block diagram of CPU P0 20 is shown. For the purposes of this application, all of the CPUs 20, 22, 23, 25 are substantially identical. In the following description, CPU P0 20 is described for simplicity, and the following description applies equally well to the other CPUs 22, 23, 25. CPU P0 20 includes a processor 102 which preferably includes an internal cache 104. The processor 102 is preferably the Intel i486 processor. However, the use of other types of processors is also contemplated. The processor 102 is coupled to a processor bus 106 including control, data and address portions, as shown.

The CPU P0 20 further has a cache memory system which includes an array of cache RAMs 110, a cache controller 108, and various cache interface logic 120 and buffers 124 to interface between the processor bus 106 and the CPU components. In the preferred embodiment, the cache RAMs 110 are C8 or 82490 cache RAMs produced by Intel Corporation, and the cache controller 108 is a C5 or 82495 cache controller, also produced by Intel. The cache controller is also connected to an address transceiver 122 for transmitting addresses to and from the host bus 24. The transceiver 122 receives control signals from the cache interface logic 120.

Figure 3:
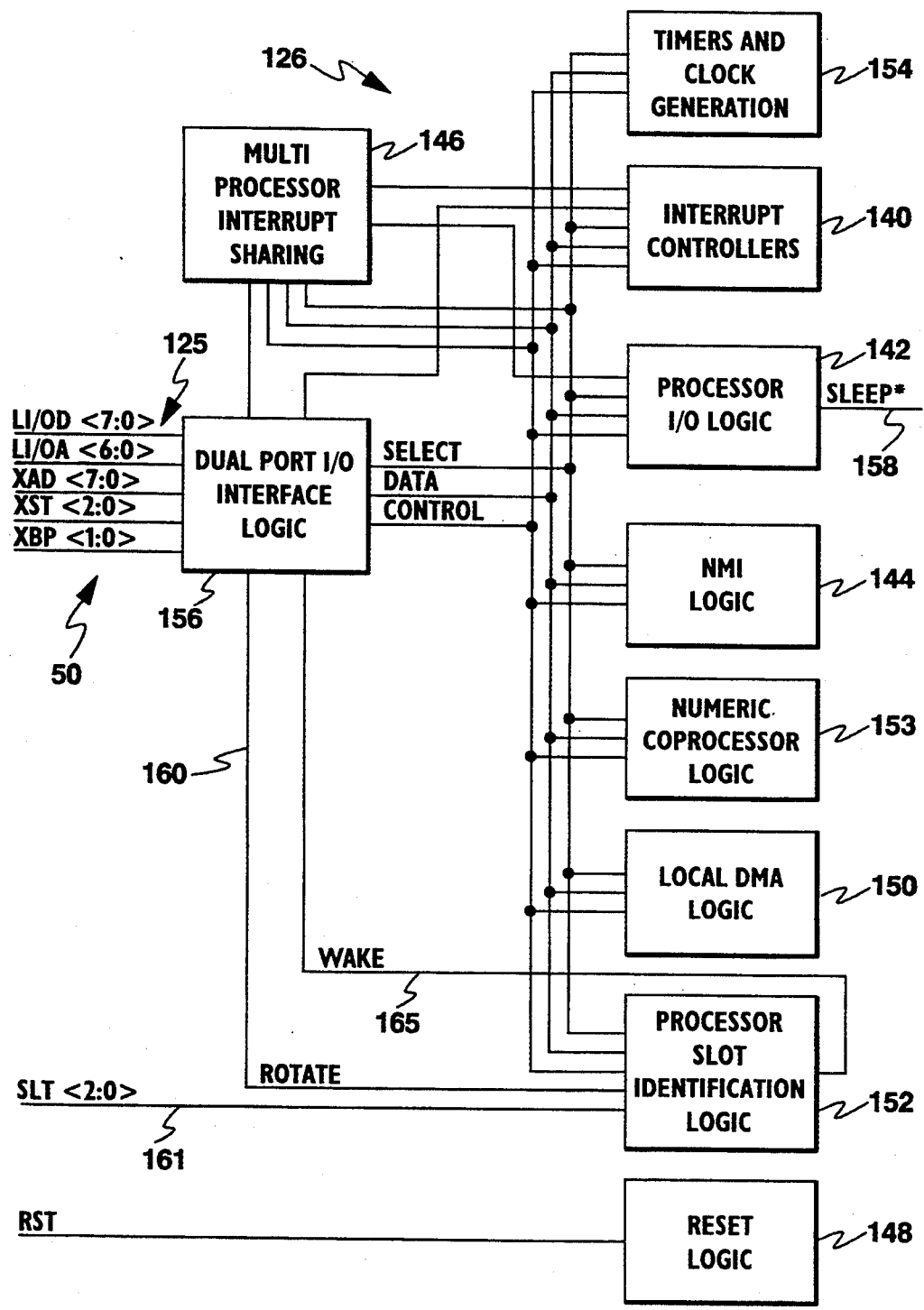
FIG. 3 is a more detailed block diagram of the distributed system peripheral (DSP) of FIG. 2.

The cache data buffer is linked not only to the host bus, but is also connected by a local I/O bus 125 to the DSP 126. The DSP 126 implements various logic functions that are closely related to the processor/cache system. Referring now to FIG. 3, the DSP 126 includes interrupt controller logic 140, preferably comprising two cascaded Intel 8259 interrupt. The controllers which provide 15 levels of interrupts. DSP 126 also includes non-maskable interrupt (NMI) logic 144 and multiprocessor interrupt sharing logic 146. The multiprocessor interrupt sharing logic 146 allows a CPU to interrupt other CPUs at any interrupt level in one I/O access, thus providing an efficient multiprocessor communication capability. Also included are reset logic 148, DMA (direct memory access) logic 150, numeric coprocessor logic 153, timer clock generation logic 154, and dual port I/O interface logic 156. The dual port I/O interface logic 156 interfaces the various registers and logic in the DSP 126 with the local I/O bus 125 and the MUX bus 50.

CPU processor I/O logic 142 on the DSP includes a processor control port, and processor slot identification logic 152 includes a CPU Identification (WHOAMI) port, an Index CPU port, and a Logical CPU Assignment (LCA) port. The processor control port controls miscellaneous processor functions, like cache enabling and flushing and processor interrupt signals. In particular, the processor control port enables and disables the SLEEP* signal 158 to the microprocessor 02. When the system is power cycled, the SLEEP* signal 158 is disabled until the processor control port is written and the SLEEP* signal 158 is enabled. Any device, including the microprocessor 102 itself, may write to a CPU's processor control port to change the sleep bit in the port, which causes the SLEEP* signal 58 to be driven low by the DSP 126. The SLEEP* signal 58 is asserted low as long as the value of the sleep bit in the processor control port remains 1.

The SLEEP* signal 158 is provided to the cache interface logic 120. In the preferred embodiment, the SLEEP* signal 158 causes a hold request to be asserted to the microprocessor 102. When the hold request is acknowledged, the internal 486 first level cache 104 and the external second level C5 cache 110 are flushed. After the flush is completed, the hold request signal remains asserted so that the microprocessor 102 stays inactive. The hold request signal is maintained as long as the SLEEP* signal 158 is asserted. Thus, to activate the microprocessor 102, the processor control port of the DSP 126 is again written to disable the sleep state, which causes the SLEEP* and the microprocessor hold request signals to be negated, and the microprocessor 102 resumes operation.

Processor slot identification logic 152 consists of the logic required for physical CPU identification and logical CPU assignment. The logical CPU assignment is an arbitrary designation of a particular CPU, and each CPU may be addressed by its physical location or logical assignment using the MUX bus 50. One of the ports in the processor slot identification logic 152 is the Index CPU port, which is used to select the physical CPU to access when the LCA port is accessed, or to select the logical CPU to access when other local ports are accessed from the EISA bus. Local ports can be accessed directly or via an Index Address port in the CSP. The Index CPU port must be written before being used to assure its contents. If the indicated CPU matches the assignment indicated by the DSP's 126 WHOAMI port, the CPU performs the local operation. Otherwise, the operation from the MUX bus 50 is ignored.

]Each DSP 126 includes a Logical CPU Assignment (LCA) port. The LCA port is used by the software, as discussed below, to assign logical CPU designations to physical CPU locations. It is also used to determine the physical location of a logical CPU. Each CPU's LCA port is accessible to all elements of the system C, but is not locally accessible but is accessible only over the EISA bus 42 through the CSP 46. The port contains CPU assignment bits used to assign the logical CPU number to the physical CPU location. The LCA port works in conjunction with the Index CPU port to access a particular physical CPU. Before the LCA port is written, the Index CPU port must be written with the desired CPU's physical location. When the LCA port is written on the next operation, the CPU having the indicated physical designation, instead of logical assignment, is accessed.

The WHOAMI port stores the logical CPU designation for the CPU and may only be read via the local bus 125. When accessed, the WHOAMI port responds with a number indicating the individual CPU's logical designation. The CPU's logical designation is determined when the system C is powered up, as discussed below. When the system C is power cycled, the WHOAMI port initially receives a value corresponding to the CPU's physical location. By accessing this port, each CPU determines its own logical CPU assignment, and therefore determines whether it is the particular CPU being addressed on the MUX bus 50.

Each CPU also receives a separate set of three SLT signals 161. The SLT signals 161 are permanently connected to particular signals to correspond to individual slots. For example, the SLT signals 161 for physical CPU slot 0 always assert 000, while those for slots 1 and 2 always assert 001 and 010, respectively. The SLT signals 161 are provided to the processor slot identification logic 152 on the DSP 126 so that each CPU may determine its physical slot location.

The processor slot identification logic 152 further receives a ROTATE signal 160 generated by the dual port I/O interface logic 156. The interface logic 156 asserts the ROTATE signal 160 when the PUTO signal is asserted on the MUX bus 50. When the ROTATE signal 160 is asserted, the processor slot identification logic 152 decrements the CPU's logical assignment in the WHOAMI port. If the CPU's logical CPU assignment is 0 when the ROTATE signal is asserted, the WHOAMI port value is set to FFh, indicating a non-functioning CPU. If the CPU's logical assignment is FFh when the ROTATE signal 160 is asserted, the ROTATE signal is ignored.

If the CPU's logical assignment rotates to 0, the processor slot identification logic 152 asserts a WAKE signal 165 to the interface logic 120. The WAKE signal 165 causes the interface logic 120 to change the processor control port's sleep bit in the processor I/O logic 142. As a result, the SLEEP* signal 158 is negated, and the CPU begins operation.

Figure 4:
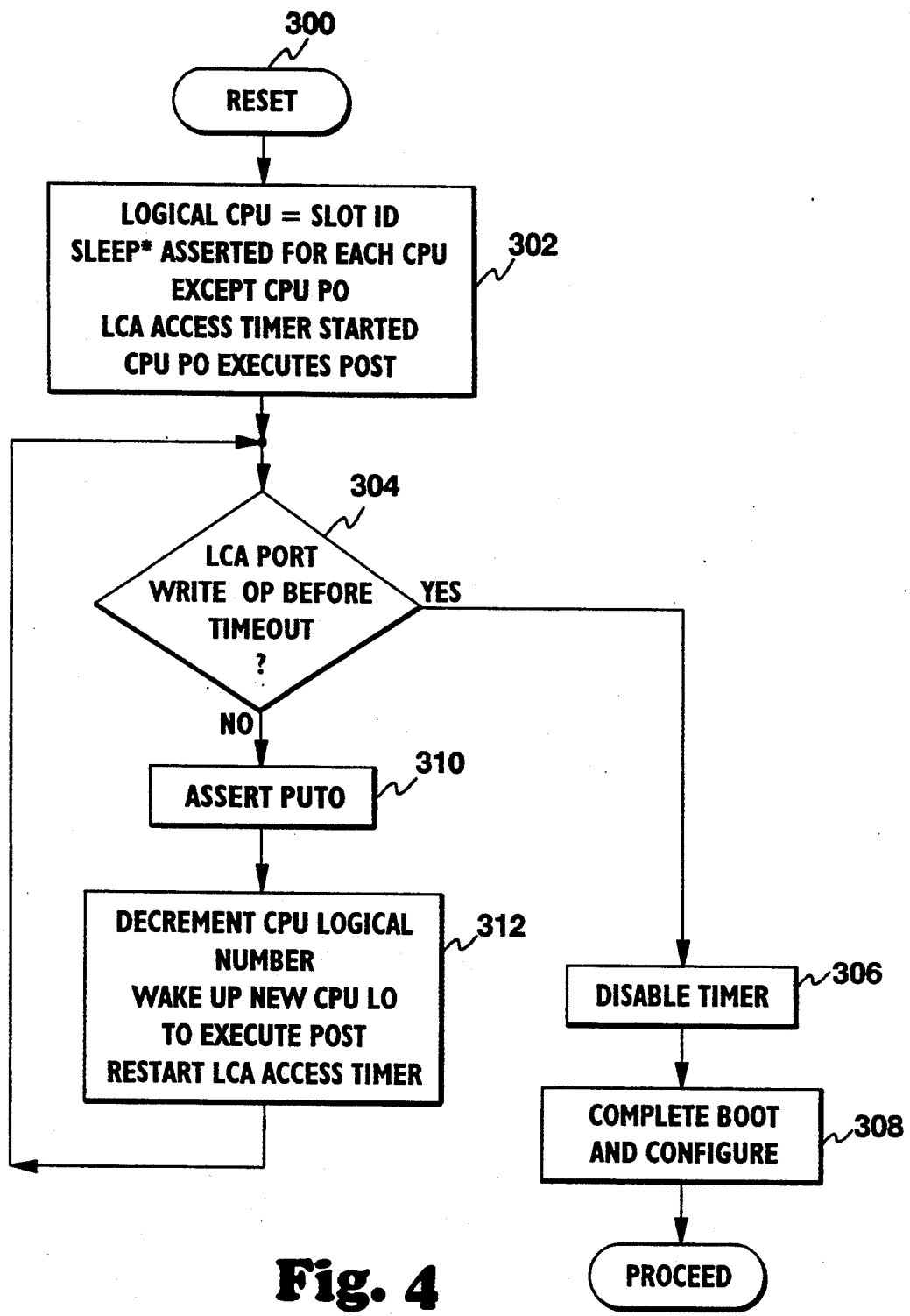
FIG. 4 is a flow diagram of the power up sequence for finding an operational CPU.

Referring now to FIG. 4, the logical configuration of the CPUs is established after the computer system is power cycled. When the system is powered up, the computer system C resets in step 300 and, in step 302, the DSP inputs the SLT signals to the WHOAMI port, so that each CPU receives an initial logical designation corresponding to its physical location. At the same time, each DSP asserts the SLEEP, signal on its CPU except for CPU P0, which remains awake and begins its power-on self test (POST) routine. In an alternative embodiment, the DSP for CPU P0 20 may also enable its sleep bit, but CPU P0 20 is then immediately awakened. When the SLEEP, signal is asserted for each CPU, all of the CPUs 22, 23, 25, except for CPU P0 20, become inactive. Meanwhile, the power up timer in the CSP 46 loads a preset interval on reset and begins counting when the reset signal is negated. In the preferred embodiment, the preset interval is approximately 2 seconds. The power up timer counts until it is disabled or times out.

The timer may be disabled by a write operation to the LCA port. In step 304, the CSP 46 determines whether a write operation to the LCA port has occurred before the timer times out. If CPU P0 20 is operating properly, the POST program directs the CPU P0 20 to execute a write operation to the LCA port. The write operation to the LCA port is detected by the CSP 46, which disables the timer in step 306.

Next, in step 308, the operational CPU, now designated CPU L0, completes its POST program and boots up the rest of the system C using standard boot software. In particular, CPU L0 wakes up and boots the remaining CPUs 22, 23, 25, with each CPU executing software to test itself and to assign an appropriate logical CPU designation. This process can conveniently be done by placing a special vector, which is interrogated early in the POST program, to special wake up code, which includes a handshake to CPU L0, so that each CPU can be brought up individually and indicate its status. For details on this startup and handshake procedure, please refer to application Ser. No. 431,743, originally entitled "COMMON RESET ROM" filed on Nov. 3, 1989, which is hereby incorporated by reference. If one of the CPUs 22, 23, 25 is not functional as indicated by a failure to handshake within a given time, it is so designated in its DSP and the next consecutive functioning CPU is designated with the next logical CPU assignment. If the slot is empty, the logical CPU assignment sequence continues at the next slot occupied by an operational CPU. In addition to booting up the other CPUs, the designated CPU L0 boots up the rest of the computer system C, and operates as CPU L0 for all unique CPU L0 functions.

If the write operation to the LCA port does not occur before the timer times out, the CSP 46 generates the PUTO signal in step 310 and it is transferred onto the MUX bus 50. When the PUTO signal is received by the DSPs 126, each DSP asserts the ROTATE signal 160 in step 312 and the logical assignment in the WHOAMI port of each CPU is decremented by 1. The current CPU L0 that failed to write the LCA port within the timer interval is assigned a value in its DSP 126 of FFh, indicating that the CPU is inoperative. A CPU having a logical assignment of FFh does not have its slot identification decremented when the power up timeout signal is asserted.

After the logical CPU assignments have been rotated, the new CPU L0 is awakened by the WAKE signal and begins the same POST code described before, which includes the write to the LCA port. The power up timer is restarted, and the process returns to step 304. The procedure repeats until an operational CPU writes to the LCA port before the timer times out and boots the rest of the system. If none of the CPUs are operational, the system will not boot up.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A method for providing a logical first processor in a multiprocessor computer system, comprising the steps of:

assigning initial logical processor values to each processor upon reset of the computer system;
    starting a timer set for a predetermined timeout upon reset of the computer system;
    causing all but the first logical processor to halt operations upon reset of the computer system;
    providing a reset sequence for the first logical processor, which sequence includes performing an operation to a predetermined location;
    halting said timer upon an operation to said predetermined location; and
    upon timeout of said timer performing the steps of:
        indicating said present first logical processor as inoperable;
        restarting said timer with said predetermined timeout; and
        decrementing said logical processor values of each processor, whereby the new first logical processor is removed from said halt condition and executes said reset sequence.

2. The method of claim 1, wherein said reset sequence for said first logical processor includes removing all operable processors from said halt condition after performing said operation to said predetermined location.

3. The method of claim 1, wherein said initial logical processor value step assigns each processor its physical processor location as its initial logical processor value.

4. A multiprocessor computer system, comprising:
    means for resetting the computer system;
    a plurality of processors, each processor including:
        means for assigning each processor an initial logical processor value upon reset of the computer system;
        means for halting each processor if said logical processor value is not a predetermined value upon reset of the computer system; and
        means for decrementing said logical processor value of each processor upon receipt of a signal and releasing the processor having a logical processor value of said predetermined value from said halt condition;
    a timer having a predetermined timeout;
    means for starting said timer upon reset of the computer system;
    means for causing said processor having said predetermined value to access a predetermined location after reset;
    means coupled to said timer for halting said timer if said processor having said predetermined value accesses said predetermined location; and
    means coupled to said timer for providing a signal to each of said processor means for decrementing said logical processor value upon time out of said timer.

5. The multiprocessor system of claim 4, further comprising:
    means for causing said processor having said predetermined value to remove each operable processors from said halt condition.

6. The multiprocessor system of claim 4, wherein each processor has a physical location and wherein said means for assigning initial logical processor values assigns the physical location value as the logical processor value.

* * * * *